United States Patent [19]

Pielemeier et al.

[11] Patent Number: 5,053,612
[45] Date of Patent: Oct. 1, 1991

[54] BARCODE BADGE AND TICKET READER EMPLOYING BEAM SPLITTING

[75] Inventors: William J. Pielemeier, Ypsilanti; James L. Jessup, Livonia, both of Mich.

[73] Assignee: Tech-S, Inc., Livonia, Mich.

[21] Appl. No.: 500,383

[22] Filed: Mar. 28, 1990

[51] Int. Cl.$^5$ .......................... G06K 7/01; G06K 7/10
[52] U.S. Cl. .................................. 235/462; 235/454; 235/482
[58] Field of Search ............... 235/454, 462, 473, 483, 235/472, 482, 467, 475, 382; 369/102, 112; 250/236; 350/6.8

[56] References Cited

U.S. PATENT DOCUMENTS

| | | | |
|---|---|---|---|
| 3,818,444 | 6/1974 | Connell | 235/467 |
| 4,003,627 | 1/1977 | Wu et al. | 350/6.8 |
| 4,115,808 | 9/1978 | Miyaoka | 369/112 |
| 4,587,407 | 5/1986 | Ahmed et al. | 235/467 |
| 4,683,371 | 7/1987 | Drexler | 235/454 |
| 4,734,566 | 3/1988 | Senda et al. | 235/454 |
| 4,926,409 | 5/1990 | Tsuyuguchi et al. | 369/112 |

Primary Examiner—Stuart S. Levy
Assistant Examiner—Robert Weinhardt
Attorney, Agent, or Firm—Krass & Young

[57] ABSTRACT

This invention is a badge and ticket barcode reader which meets the need in the art for a cost effective and reliable barcode reader for naive users. It employs a charge coupled device type scanner in conjunction with a beam splitter, an illumination source which illuminates both sides of the card, a set of mirrors and a guide slot. The set of mirrors reflect light from the two sides of the card to opposite faces of the beam splitter and thus produces an overlaid image of the two sides. The output of the charge coupled device is processed in a known fashion to decipher the barcode. The two sides of the card may be illuminated by a single source via the beam splitter and the set of reflectors or directly via separate sources. The barcode reader may resolve the ambiguity of the two overlaid images either by printing the reverse side of the card black, or via two light sources that are activated alternately in synchronism with the scan of the charge coupled device. The set of reflectors may include three reflectors or two reflectors. This technique is useful for naive users because it can read the badge or ticket no matter which side is inserted, it reads when the badge or ticket is partially or fully inserted and no particular motion other than nearly full insertion is required.

21 Claims, 7 Drawing Sheets

BARCODE BADGE AND TICKET READER EMPLOYING BEAM SPLITTING

TECHNICAL FIELD OF THE INVENTION

The technical field of this invention is that of barcode readers, and more particularly self-scanning barcode readers which can read either side of an imprinted badge or ticket by beam splitting.

BACKGROUND OF THE INVENTION

Barcode systems are used in a variety of applications for record keeping, article tracking and control. Typically an article has an imprinted barcode which includes identity data. The barcode is deciphered by a barcode reader revealing the identity of the object and permitting analysis and control based upon this data.

Such barcode tracking and control systems are of value in tracking and control of people. A typical use would be in attendance tracking and job analysis of employees using barcode imprinted employee badges. Another use would be in ticket taking.

Several problems exist in the prior art which prevent more widespread use of barcode reader systems in badge and ticket applications. Current barcode readers which are inexpensive enough for widespread use in these applications are insufficiently capable of reliable use by first time users.

Barcode readers come in manual scanning and self-scanning types. Manual scanning barcode readers include swipe types and wand types. Swipe type readers require the user to manually move the element including the imprinted barcode through a sensing region, which is generally a slot. Wand type readers require manual movement of a sensing element over the imprinted barcode. Self-scanning barcode readers include laser scanners and charge coupled device (CCD) scanners.

There are two common problems inherent in most existing swipe type readers. The first problem with swipe type readers is that the barcode must be on the correct side of the card (i.e., facing the single scanner opening in one side of the slot). The second problem is that the card must be swiped smoothly through the slot within a limited speed range. There is a substantial chance of misreading the barcode or of being unable to read the barcode if the swipe is not smooth or is not within the limited speed range. Even if the swipe is within the limited speed range, the barcode reader may not always read correctly if the barcode is not of high quality.

Wand type readers have problems similar to swipe type readers. Wand type readers are more likely to be scanned on the proper side in the first instance than swipe type readers because the user can see the relationship between the sensor and the barcode when using the wand. In other respects wand type readers are even worse than swipe type readers. Wand type readers require considerable technique to be reliable. They tend to be rather sensitive to the speed and smoothness of the motion of wanding the card. There is no inherent guide for the motion of wanding the barcode as provided in swipe type readers. In addition, wand type readers are inherently more vulnerable to abuse and misuse than swipe type readers due to the exposed components in the wand.

Self-scanning barcode readers are more likely to provide reliable first readings. Laser scanners generally employ moving mirrors for scanning. Laser scanners have a large depth of field and are thus useful in applications where the position of the barcode is not fixed. Laser scanners typically provide more reliable readings than manual scanning barcode readers, but are expensive and have moving parts which can break down. Laser scanners are typically not employed in card or badge readers because of their expense. However if laser scanners were so employed, most would also require the card or badge to be inserted facing the correct way. Charge coupled device scanners are very reliable, have high read rates for poor barcodes, and are less expensive than laser scanners. Thus charge coupled device scanners would be nearly ideal for these applications, but currently available configurations still require the badge or ticket to face the correct way to read.

Our prior U.S. patent application Ser. No. 07/463,112 filed Jan. 11, 1990, entitled BARCODE BADGE AND TICKET READER disclosed a system employing a charge coupled device type scanner in conjunction with an illumination source, a set of mirrors and a card guide. Light from the illumination source is directed to both sides of the card. The scanning field of the charge coupled device is split in two, with the mirrors directing the split field to opposite sides of the card guide. This enables the badge or ticket to be inserted with the barcode on either side and still be readable. The split of the scanning field of the charge coupled device requires that the length of the charge coupled device be twice the length of the barcode.

The system of our prior patent application also has problems. This system requires a single charge coupled device scanner to cover either side of the card. As a consequence either the charge coupled device must be twice as long as the barcode scanned or some resolution is lost.

Therefore there is a need in the art for a barcode reader which is both cost effective and which provides a high probably of a correct first reading when employed by naive users. It would be particularly ideal to have such a barcode reader for badges or tickets which does not require a particular orientation for correct reading.

SUMMARY OF THE INVENTION

This invention is a badge and ticket barcode reader which meets the need in the art for a cost effective and reliable barcode reader for naive users. It uses standard barcode technology for printing the badges or tickets. This invention uses a guide for insertion of the badge or ticket. It can read the badge or ticket no matter which side is inserted, as long as the end with the barcode is inserted into the guide. The preferred embodiment reads when the ticket is partially or fully inserted. No particular motion other than insertion is required, because the barcode reader of this invention employs self-scanning. The badge or card can be read when standing still, independent of insertion speed. These aspects of the invention provide a barcode reader which is sufficiently user friendly to allow quick, reliable badge or ticket reading for first time users.

The barcode reader of this invention includes a guide slot for accommodating the end of the barcode imprinted card. Both sides of the card are illuminated. A set of reflectors reflect light from a first side of the card to the first face of a beam splitter and reflect light from the second side of the card to the second face of the beam splitter. This beam splitter is preferably a half silvered mirror. A light sensitive device, such as a linear charge coupled device imager, receives an overlaid image of the first and second sides of the card from the beam splitter.

The card may be illuminated in two differing fashions. A single source of illumination, which may comprise a light emitting diode array, may be disposed relative to the opposite face of the beam splitter from that of the light sensitive device to illuminate the card along light paths parallel to the imaging light. Alternatively, two sources of illumination may directly illuminate the respective sides of the card.

The barcode reader of this invention may resolve the ambiguity of the two overlaid images in two fashions. If the reverse side of the card is printed black, the overlaid image corresponds to only the barcode. If two light sources are employed they may be activated alternately in synchronism with the scan of the light sensitive device. This provides separable images of the two sides of the card.

The set of reflectors may include two or three reflectors. If three reflectors are used, the beam splitter is disposed below and on a first side of the guide slot. The first reflector is disposed on a first side of the guide slot for reflecting light from a first side of the card to a first face of the beam splitter. A second oppositely disposed reflector reflects light from the second side of the card. The third reflector reflects light from the second reflector to the second face of the beam splitter.

If two reflectors are employed, the beam splitter is disposed at or near the plane of the card. The first reflector is disposed on a first side of the card at first orientation for reflecting light from the first side of the card to the first face of the beam splitter. The second reflector is disposed on the other side of the card at an opposite orientation for reflecting light from the second side of the card to the second face of the beam splitter. These two reflectors may be oriented to reflect a foreshortened image of the card or an image viewed via the perpendicular. The beam splitter may be disposed below the guide slot or beside the guide slot.

BRIEF DESCRIPTION OF THE DRAWINGS

These and other aspects and objects of this invention will become clear from the following description of the invention, taken in conjunction with the Figures in which.

DETAILED DESCRIPTION OF THE PREFERRED EMBODIMENT

The arrangement of this invention will now be described. Several possible alternative embodiments are shown in the accompanying figures.

Figure 1:
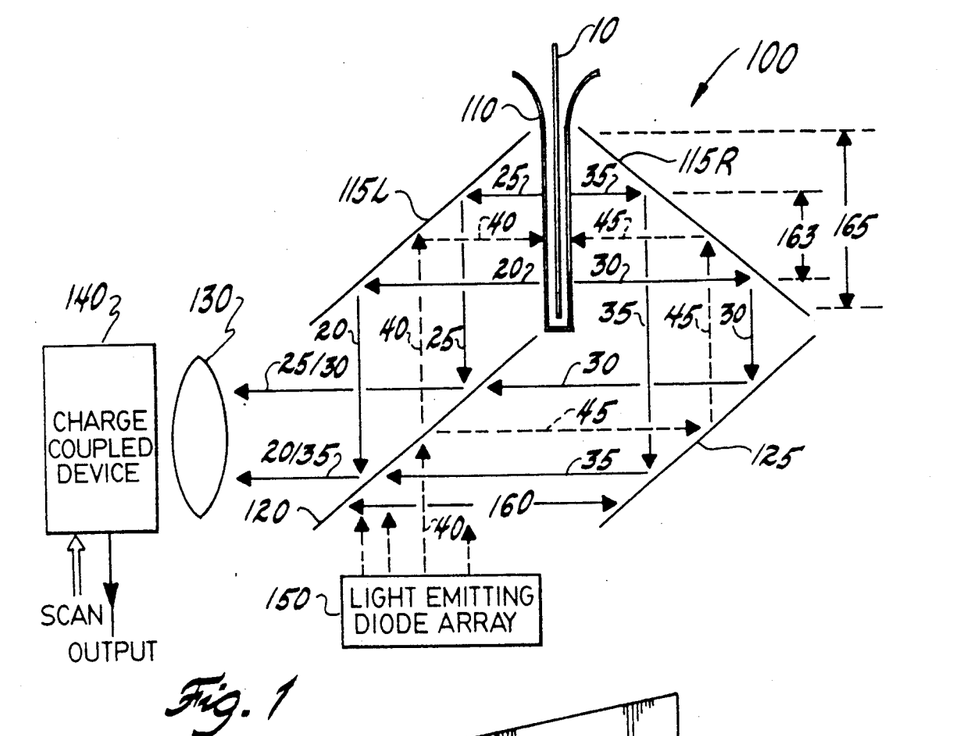
FIG. 1 is a schematic end view of one embodiment of this invention.

FIG. 1 is an end view of barcode reading apparatus 100 according to a first embodiment of the invention. The invention includes a guide slot 110 which receives the card 10. In this application card 10 is used to refer to any substantially flat, planar object (such as an employee identification badge or a printed ticket) which has an end that can be inserted into guide slot 110 and has a barcode imprinted on that end. Except for these essential features, card 10 can take any of a variety of forms.

Guide slot 110 and any card 10 located therein are illuminated on both sides by an illumination source 150, preferably a light emitting diode array. This illumination is split by beam splitter 120. Light transmitted through beam splitter 120 (exemplified by ray 40) reflects from reflector 115L and illuminates the left side of card 10. Light reflected by beam splitter 120 (exemplified by ray 45) reflects from reflectors 125 and 115R and illuminates the right side of card 10. Beam splitter 120 is preferably a half silvered mirror. Note that the portion of guide slot 110 which is illuminated must be transparent to permit illumination of card 10 and detection of any imprinted barcode. This portion of guide slot 110 is preferably constructed of transparent plastic or glass.

Light reflected from the card 10 is directed by reflectors 115L and 115R to opposite faces of beam splitter 120. Light from the left side of card 10 (exemplified by rays 20 and 25) is reflected by reflector 115L, then further reflected by beam splitter 120 to lens 130 and hence to charge coupled device 140. Likewise, light from the right side of card 10 (exemplified by rays 30 and 35) is reflected by reflector 115R, further reflected by reflector 125, passes through beam splitter 120 to lens 130 and hence to charge coupled device 140. Lens 130 serves to focus the reflected light on the light sensitive elements of charge coupled device 140.

Charge coupled device 140 is a light sensitive device having a plurality of light sensitive elements. These light sensitive elements are disposed in a linear array along a line perpendicular to the illustration. In accordance with the known characteristics of charge coupled devices, the plural light sensitive elements accumulate charge at a rate dependent upon light intensity. Periodically the accumulated charge is read out at the output in accordance with signals received at the scan input. This is accomplished by shifting the accumulated charge through an analog shift register to the output. The rate of reading the line of light sensitive elements is generally in the range of 50 to 200 times per second, in accordance with the known construction of such charge coupled devices. Thus charge coupled device 140 generates an analog electrical signal which has time periods which correspond to locations of light sensitive elements. This output represents a scan of the reflectivity of any barcode located on the card 10. This scan output is processed as known in the art to yield the information or data encrypted in the barcode. The combination of lens 130, charge coupled device 140 and the necessary associated processing and control electronics are commercially available as a single subassembly.

Note that both sides of card 10 are illuminated continuously by light emitting diode array 150. Also note that charge coupled device 140 receives overlaid images of the two sides of card 10 due to beam splitter 120. In order to properly detect a barcode imprinted on either side of card 10, the side opposite the barcode must be imprinted with a black region. This black region does not interfere with the detection of the light and dark bars of the barcode on the other side of card 10. This permits charge coupled device 140 to determine the barcode from the overlaid images of the two sides.

The optical path from charge coupled device 140 to the two sides of card 10 differs. The imprinted barcode has a height 165. The charge coupled device 140 views only a portion of height 165 as defined by scan height 163. Note that the optical path to the right side of card 10 is longer by a distance 160. This is the optical path length between beam splitter 120 and reflector 125. This distance 160 is related to the scan height 163 of the scan path viewing the barcode and the thickness of guide slot 11. In a typical application in which card 10 is an employee badge or printed ticket, scan height 163 is on the order of one eight of an inch and the distance 160 is on the order of one half an inch. Charge coupled device 140 and lens 130 must be constructed to provide a depth of field of at least as great as this distance 160. The typical commercial subassembly including lens 130, charge coupled device 140 and the associated electronics are constructed with at least this depth of field.

Figure 2:
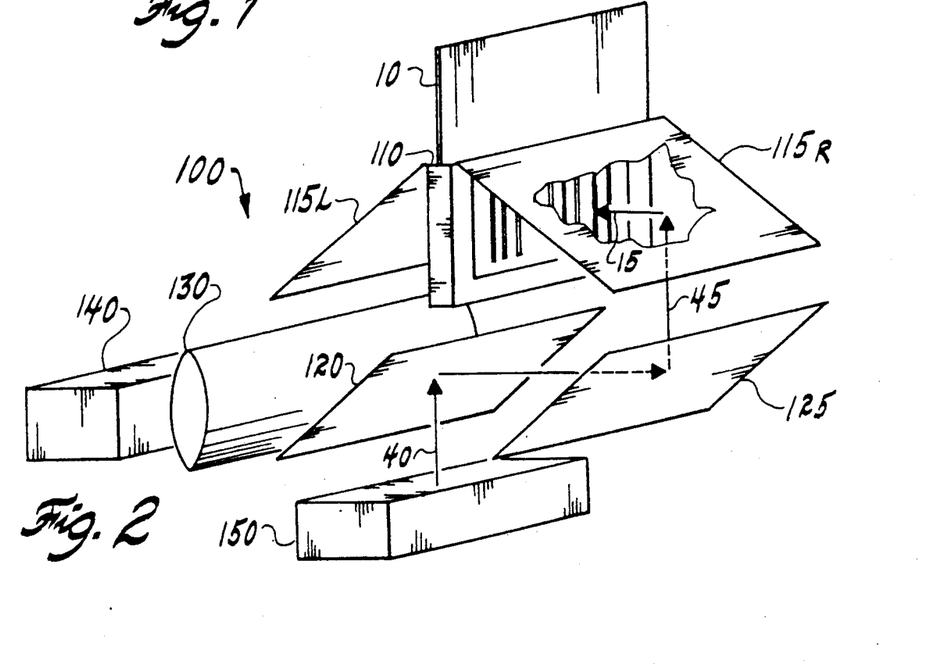
FIG. 2 is a partially cut away perspective view of the embodiment of this invention illustrated in FIG. 1.

FIG. 2 is a partially cut away perspective view of the barcode reading apparatus 100. Lens 130, charge coupled device 140 and illumination source 150 are disposed below guide slot 110 as viewed in FIG. 2. Illumination source 150 illuminates the two sides of card 10 via beam splitter 120 and consists of an elongated light source or a linear set of light sources. It is known in the art to employ an array of light emitting diodes in charge coupled device barcode scanners. Illumination source 150 illuminates card 10 via reflectors 115L and 115R using light paths substantially parallel to the light paths from card 10 to charge coupled device 140. Illumination source 150 illuminates card 10, and particularly barcode 15 of card 10, via ray 45 as illustrated in the cut away portion of reflector 115R.

FIG. 2 more clearly illustrates the direction of insertion of card 10 into barcode reading apparatus 100. FIG. 2 illustrates that card 10 is inserted in a direction perpendicular to the line of scan of charge coupled device 140. This direction of insertion requires that the barcode be imprinted across the bottom of card 10 perpendicular to the direction of insertion as illustrated in FIG. 2. This direction of insertion serves to enhance the readability of barcode 15. Assuming a rectangular card, barcode 15 is usually imprinted on one of the shorter sides with the direction of scan across the shorter side. Firstly, bars 15 are thus relatively unchanged with any motion in the insertion direction. This permits the barcode to be read, perhaps multiple times, during an interval from partial insertion to full insertion. Note that the scan height 163 is generally less than the bar height 165 permitting multiple scans during insertion. Secondly, by permitting such multiple readings the likelihood of a correct reading is enhanced. Multiple readings at multiple locations of the same barcode reduces the chance that a small void in a bar or a stray mark in a space will cause the barcode to be misread.

FIGS. 1 and 2 illustrate lens 130 and charge coupled device 140 opposite one face of beam splitter 120 while light emitting diode array 150 is opposite the other face. These roles may be reversed with lens 130 and charge coupled device 140 below beam splitter 120 and light emitting diode array 150 disposed beside beam splitter 120. Beam splitter 120 operates in the same fashion regardless of which construction is employed. The construction employed can thus be selected based upon other factors, such as the available space at these two locations.

Figure 3A:
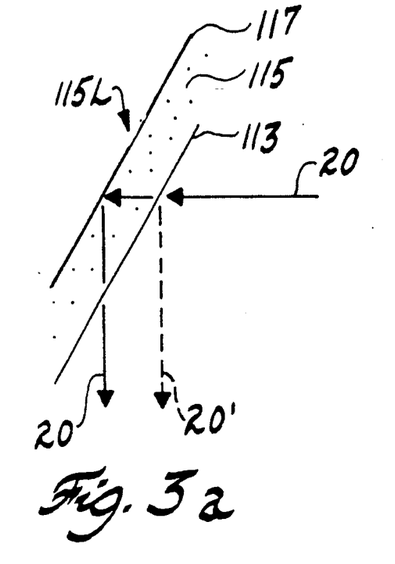
FIGS. 3A and 3B illustrate the advantage of using a first surface mirror in the embodiment of this invention illustrated in FIG. 1.
Figure 3B:
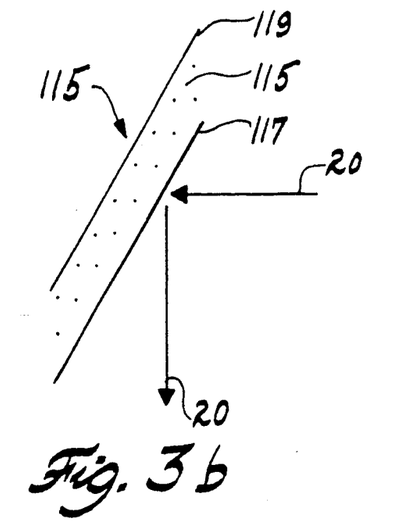

FIGS. 3A and 3B illustrate the details of the construction of reflector 115L. Though only reflector 115L is illustrated in FIGS. 3A and 3B, it should be clear that the same considerations apply to reflectors 115R and 125. FIG. 3A illustrates a normal mirror in which a reflective coating 117 is disposed on the back surface of a transparent substrate 115. FIG. 3B illustrates a first surface mirror in which the reflective coating 117 is disposed on the front surface of transparent substrate 115.

Regular mirrors, such as illustrated in FIG. 3A, reflect light mainly from the reflective coating 117 disposed on the back surface. However, such mirrors tend to reflect some of the light from the front surface 113 due to the change in index of refraction upon entering substrate 115. As illustrated in FIG. 3A, this second reflection can cause the appearance of a shifted ghost image. Note primary reflected ray 20 has a corresponding ghost ray 20'. Ghost images can prevent proper detection of the barcode.

FIG. 3B illustrates a special mirror called first surface mirror which can be used to avoid this problem. Note that ray 20 does not enter the transparent substrate 115, but is reflected from reflective coating 117 located on the front surface. Thus there is no reflection from the back surface 119 and no ghost ray 20'. First surface mirrors are preferred in this embodiment, because the existence of ghost images could create false readings of the barcode.

Figure 4:
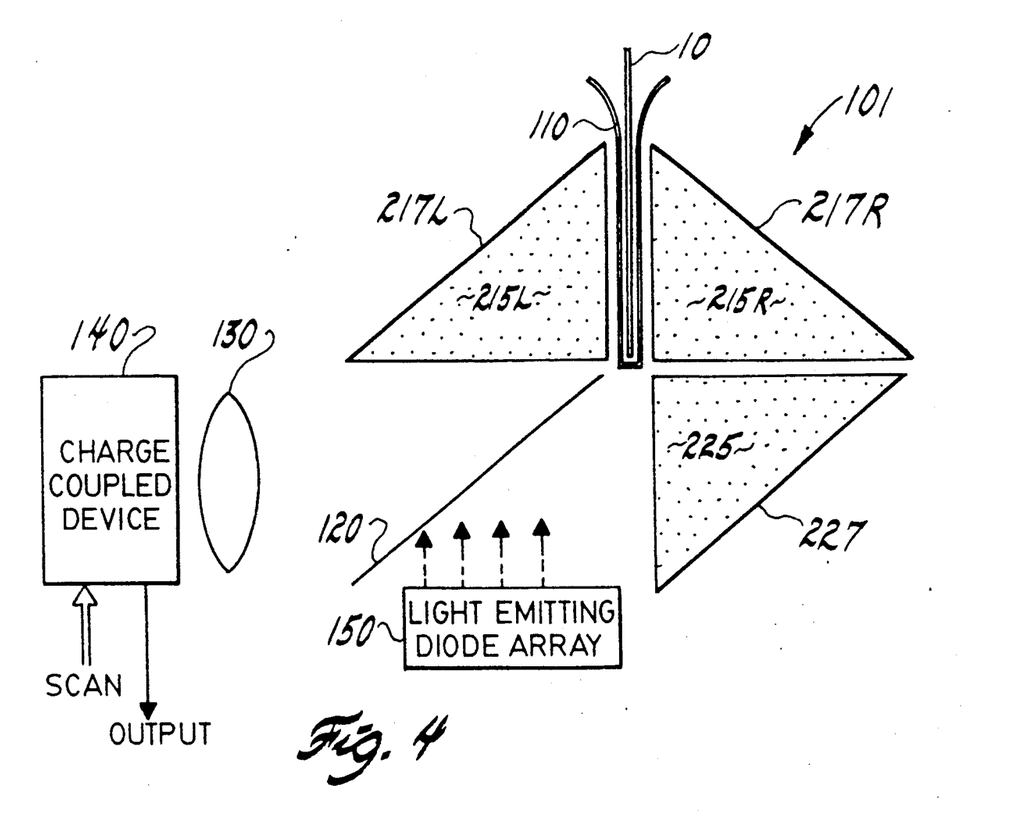
FIG. 4 is a schematic end view of an alternative embodiment of the reflectors illustrated in FIG. 1.

Such first surface mirrors require special handling and are more susceptible to corrosion than normal mirrors. Thus it would be advantageous to avoid the requirement for first surface mirrors. FIG. 4 illustrates barcode reading apparatus 101 having an alternative construction to that of FIG. 1, which avoids ghosting and which does not require the use of first surface mirrors. FIG. 4 illustrates prisms 215L, 215R and 225 instead of mirrors. Prisms 215L, 215R and 225 solve both these problems, because the reflections take place at back surfaces 217L, 217R and 227, respectively. These back surfaces 217L, 217R and 227 can have a reflective coating similar to that of normal mirrors (such as illustrated in FIG. 3A) which are covered to avoid corrosion and handling problems. The surfaces that the light passes through are perpendicular to the light path. Thus no ghost images are formed by any surface reflections. In some applications it may be necessary to provide antireflection coatings on the bottom surfaces of prisms 215L and 215R and the vertical surface of prism 225 to reduce the amount of light from illumination source 150 which is reflected directly back to charge coupled device 140 via beam splitter 120. It is also feasible to use prisms such as prisms 215L, 215R and 225 without reflective coatings by relying upon internal reflections due to the change in index of refraction at the back surfaces 217L, 217R and 227.

Figures 5, 6:
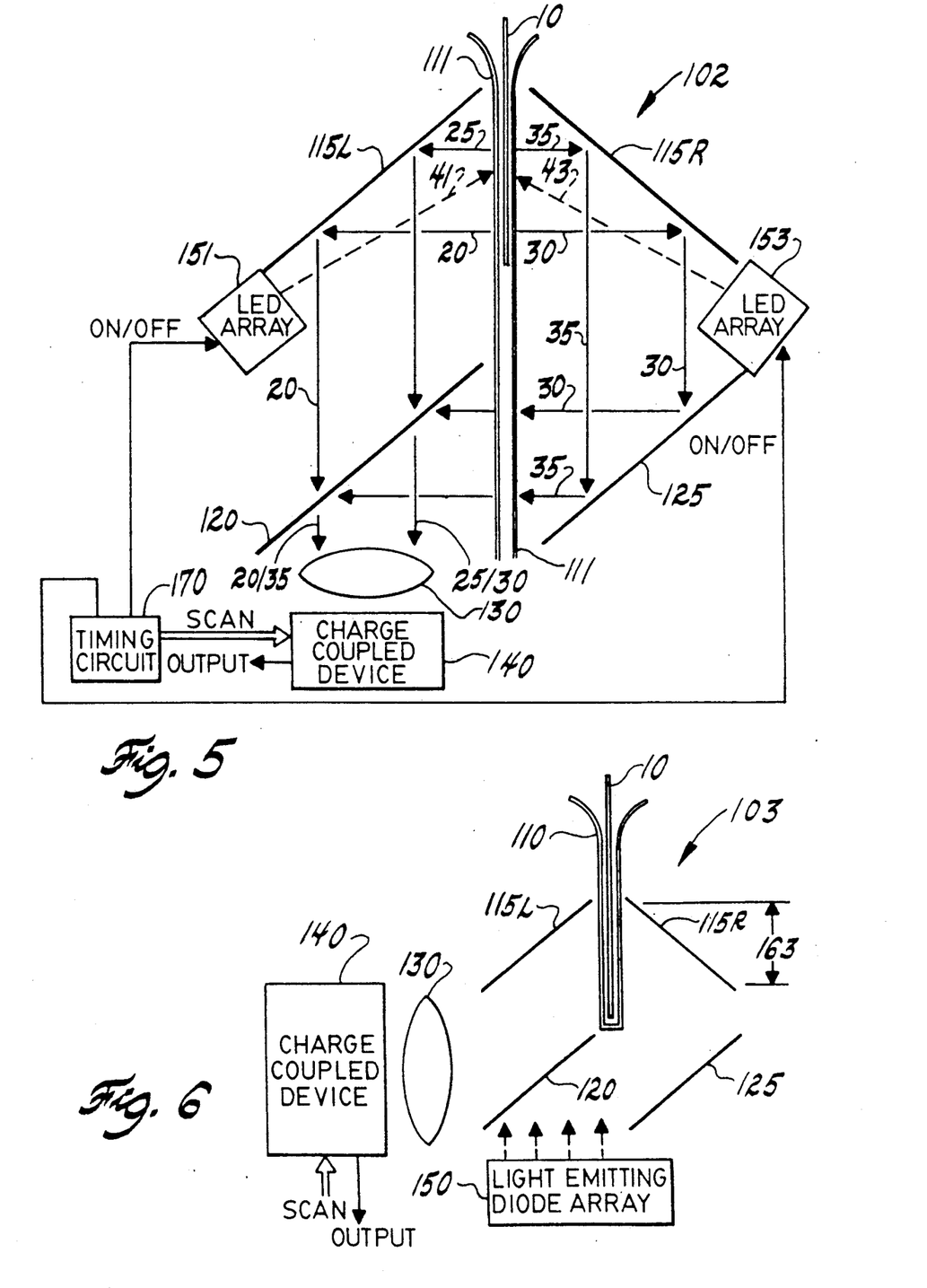
FIG. 5 is a schematic end view of an alternative embodiment of this invention permitting the card to pass through the reader for further handling and having an alternate illumination technique.
FIG. 6 is a schematic end view of a further alternative embodiment of the reflectors illustrated in FIG. 1.

FIG. 5 illustrates barcode reading apparatus 103 which includes an alternative manner of illumination. Light emitting diode array 151 directly illuminates the left side of card 10 via rays 41. Likewise, light emitting diode array 153 directly illuminates the right side of card 10 via rays 43. Thus the illumination does not pass through beam splitter 120 as in the case of barcode reading apparatus 100 illustrated in FIG. 1. Note that FIG. 5 illustrates lens 130 and charge coupled device 140 disposed below beam splitter 120 in accordance with the alternate permitted location.

The use of separate illuminating sources for the left and right sides of card 10 permits another manner of resolving the ambiguity in the overlaid image at charge coupled device 140. FIG. 5 illustrates timing circuit 170 which produces the scan signals applied to charge coupled device 140 and separate On/Off signals to light emitting diode arrays 151 and 153. Timing circuit 170 is constructed to alternately enable illumination by light emitting diode arrays 151 and 153 in synchronism with the scan signals applied to charge coupled device 140. Thus light emitting diode array 151 would be enabled and light emitting diode array 153 disabled during a first scan operation of charge coupled device 140. Then light emitting diode array 153 would be enabled and light emitting diode array 151 disabled during the next scan operation of charge coupled device 140. Light emitting diodes are particularly useful when the illumination sources are to be switched in this manner. Light emitting diodes can be switched on and off rapidly enough to accommodate alternate illumination of the two sides of card 10 at the typical rate of scan of charge coupled devices employed in barcode readers. The output of charge coupled device 140 would thus be alternate indications of the reflectively of the left and right sides of card 10. This output can be interpreted, in conjunction with an indication from timing circuit 170 of the scan rate, to determine the side of card 10 having the barcode and the data encoded in this barcode. Thus there is no need for the reverse side of card 10 to be printed black in this embodiment.

There are several additional uses of this alternate illumination of the different sides of card 10. Firstly, some charge coupled devices and the corresponding processing electronics require multiple scans of the barcode for reliable operation. The alternate illumination technique can be employed in these systems by illuminating only a first side of the card for the number of scans required for reliable operation followed by illumination of only the other side for a similar number of scans. Thus this alternate illumination technique can be employed with such charge coupled devices. Secondly, this alternate illumination technique permits reading of barcodes printed on both sides of the card. Each such barcode must include encoded identity data for resolution of the ambiguity of which scan output corresponds to which side of the card. The synchronism between the scan rate of charge coupled device 140 and the illumination indicates which side of the guide slot 111 corresponds to which scan, but does not indicate which of the two possible orientations of card 10 is used. The result is alternate outputs which correspond to alternate barcodes printed on the two sides of the card.

FIG. 5 illustrates a further difference between barcode reading apparatus 102 and barcode reading apparatus 100 illustrated in FIGS. 1 and 2. If a motor driven transport for card 10 is desired, then the construction of barcode reading apparatus 102 is preferred. This construction is preferred because card 10 can be carried completely through the apparatus via guide slot 111 without need to reverse direction. Such motor tr‑ ‑ ort may be used to take some or all cards from the user after scanning and/or to perform some sorting or printing operation on the cards.

Note that FIG. 5 illustrates that rays 30 and 35 from the right side of card 10 must pass through guide slot 111. Depending upon the degree of transparency of guide slot 111, this may result in degradation of the intensity of light reaching charge coupled device 140 and may decrease the reliability of barcode detection. This problem can be solved by increasing the illumination of the right side of card 10 via light emitting diode array 153 to compensate for this loss of intensity. The illumination strength of light emitting diodes can be controlled by control of their current. This compensation can be made upon manufacture or can be periodically made during use by inserting into guide slot 111 a card with a standard reflectivity on both sides to serve as a calibration standard.

FIG. 6 illustrates barcode reading apparatus 103 in accordance with a further embodiment of this invention which permits more compact construction. In FIG. 6 reflectors 115L, 115R and 125 and beam splitter 120 are smaller than that illustrated in FIG. 1. This smaller size is permitted because these optical elements are constructed based upon the scan height 163 rather than the bar height 165. Because scan height 163 is smaller, the reflectors do not need to cover as great an area of guide slot 110. Thus these elements can be made smaller and closer together as compared with the construction of FIG. 1.

Figures 7, 8:
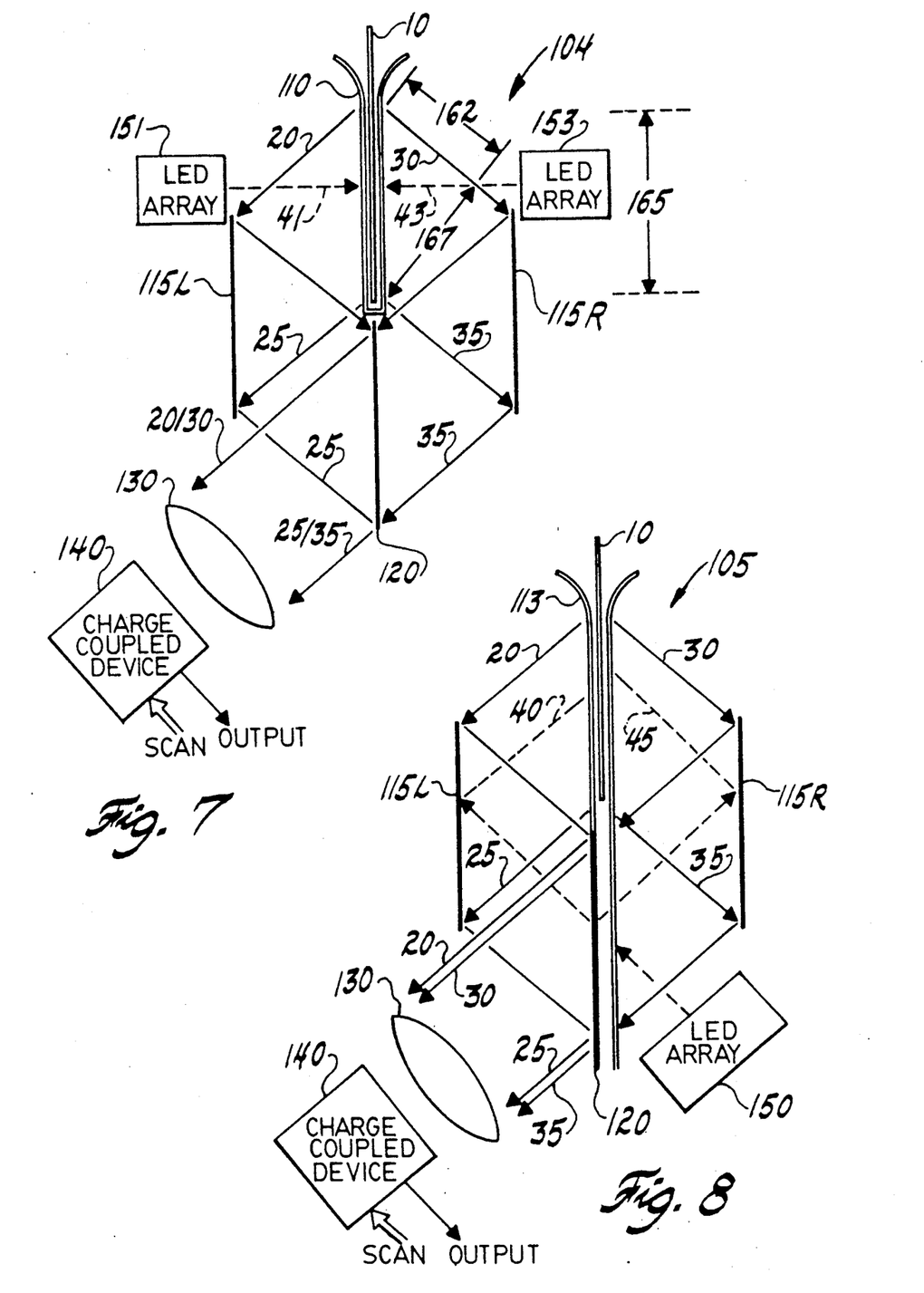
FIG. 7 is a schematic end view of an alternative embodiment of this invention which requires only two reflectors.
FIG. 8 is a schematic end view of an alternative embodiment similar to that illustrated in FIG. 6 permitting the card to pass through the reader for further handling.
Figure 9:
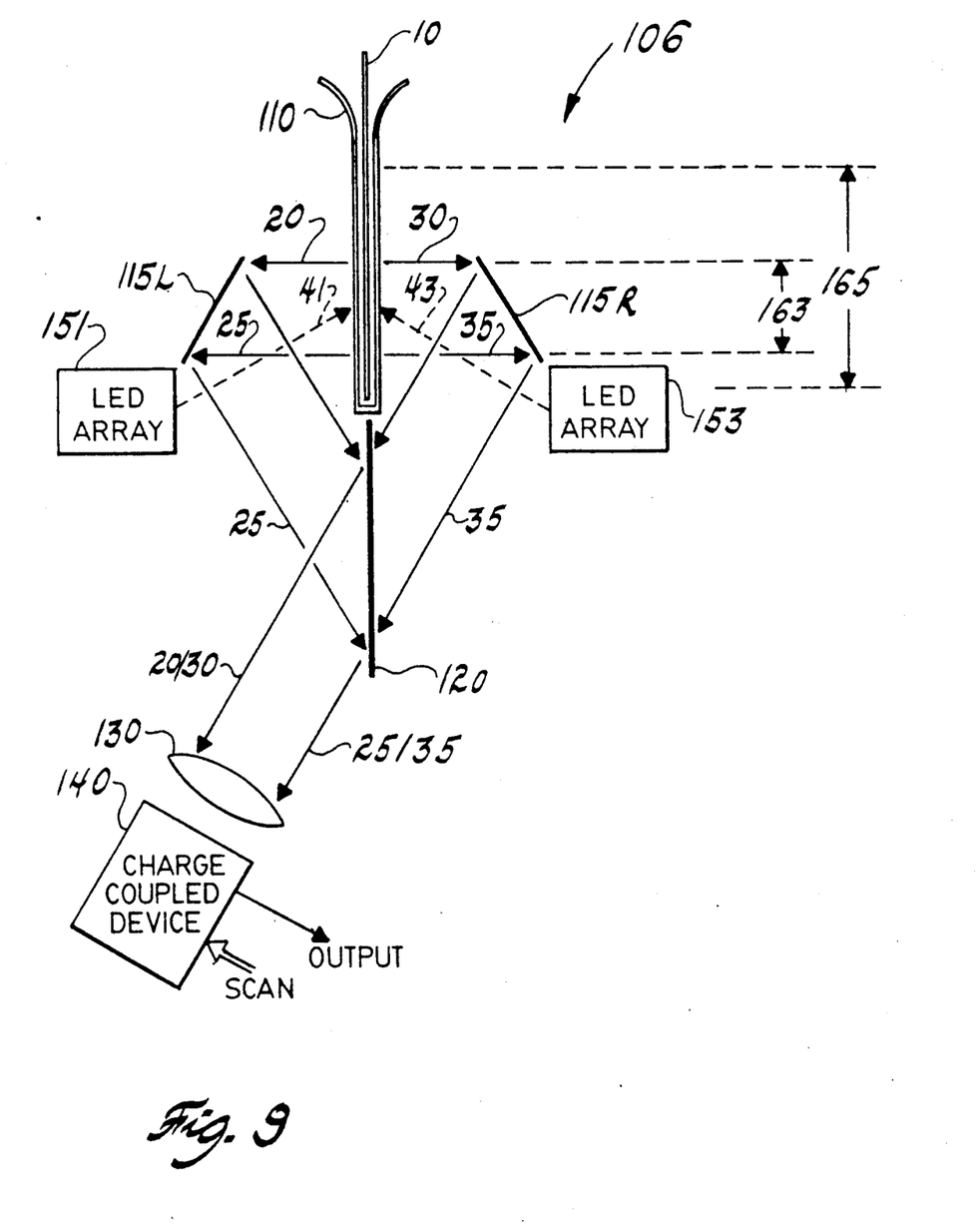
FIG. 9 is a schematic end view of an alternative embodiment of the present invention which requires only two reflectors and requires only a narrow depth of field.

FIGS. 7, 8 and 9 illustrate further embodiments of the present invention. FIGS. 7, 8 and 9 illustrate embodiments which require only two reflectors rather than the three reflectors required in the embodiments illustrated in FIGS. 1, 2, 4, 5 and 6.

FIG. 7 illustrates barcode reading apparatus 104 in which card 10 is directly illuminated. The left side of card 10 is illuminated by light emitting diode array 151 according to exemplary ray 41. In the same fashion, the right side of card 10 is illuminated by light emitting diode array 153 according to exemplary ray 43. Light reflected from the left side of card 10 at an angle falls on first reflector 115L. Reflector 115L reflects this light to a first face of beam splitter 120, where it is further reflected to lens 130 and charge coupled device 140. Note that beam splitter 120 is disposed in the same plane as card 10. A similar light path travels from the right side of card 10 to reflector 115R and is transmitted through beam splitter 120 to lens 130 and charge coupled device 140.

This arrangement permits the use of one less reflector than in the previous embodiments. The card 10 is viewed at an angle by lens 130 and charge coupled device 140, however. This results is some foreshortening of the image of card 10 at charge coupled device 140. The effective scan height at charge coupled device 140 is shown at 167. This effective scan height 167 is less than the scan height 163 (see FIG. 1). Effective scan height 167 is dependent upon the angle of view of card 10 and decreases for increased angles. Note that foreshortening is of the height of the barcode and not of its length. Thus no resolution is lost in this image.

Unlike the prior embodiments, the optical path to different locations of the same side of card 10 differs. The maximum depth of field required by lens 130 and charge coupled device 140 equals distance 162. This represents the additional optical path distance from the top of the scanned portion of the barcode at the top of guide slot 110 in relation to the bottom of the scanned portion of the barcode. In the typical embodiment, this required depth of field is believed to be about one eight of an inch, which poses no problem in this embodiment.

FIG. 8 illustrates a further alternative embodiment having light paths similar to those illustrated in FIG. 7. In FIG. 8 the two sides of card 10 are illuminated by a single light emitting diode array 150 opposite the other face of beam splitter 120 that the combination of lens 130 and charge coupled device 140. This manner of illumination is similar to that previously described in conjunction with FIGS. 1, 2, 4 and 6. Because light emitting diode array 150 simultaneously illuminates both sides of card 10, this embodiment requires card 10 to have the side opposite the barcode printed in black as previously described.

FIG. 8 further illustrates a manner to permit card 10 to pass through the barcode reading apparatus 105. Beam splitter 120 has been slightly displaced out of the path of card 10 and forms one side of the lower portion of guide slot 113. This causes a slightly different optical path than that illustrated in FIG. 7 so that rays 20 and 30 and rays 25 and 35 no longer coincide at lens 130. This requires a slightly greater depth of field than that required in the embodiment of FIG. 7, on the order of the width of guide slot 113.

FIG. 9 illustrates barcode reading apparatus 106 which is constructed to require only two reflectors. Reflectors 115L and 115R are disposed so that card 10 is viewed on the perpendicular. This requires that the reflectors 115L and 115R are disposed away from guide slot 110 in order to reflect the required image to beam splitter 120. Because of the angles involved, beam splitter 120 must be longer in this embodiment than in the previous embodiments. In the case in which reflectors 115L and 115R are disposed at respective angles of 22.5 degrees to the plane of card 10, beam splitter 120 must be approximately one and one half times the scan height 163. The minimum light path length from the barcode to the charge coupled device 140 and lens 130 system (i.e., the focal length) is approximately 3 and one half times the scan height 163. The construction illustrated in FIG. 9 serves to minimize the depth of field required of the combination of lens 130 and charge coupled device 140.

As previously illustrated in FIG. 6, barcode reading apparatus 106 illustrated in FIG. 9 includes reflectors 115L and 115R sized to cover only scan height 163 and not the whole bar height 165. Thus reflectors 115L and 115R and beam splitter 120 do not need to be as large as would be required in the entire bar height 165 were covered.

Figure 10:
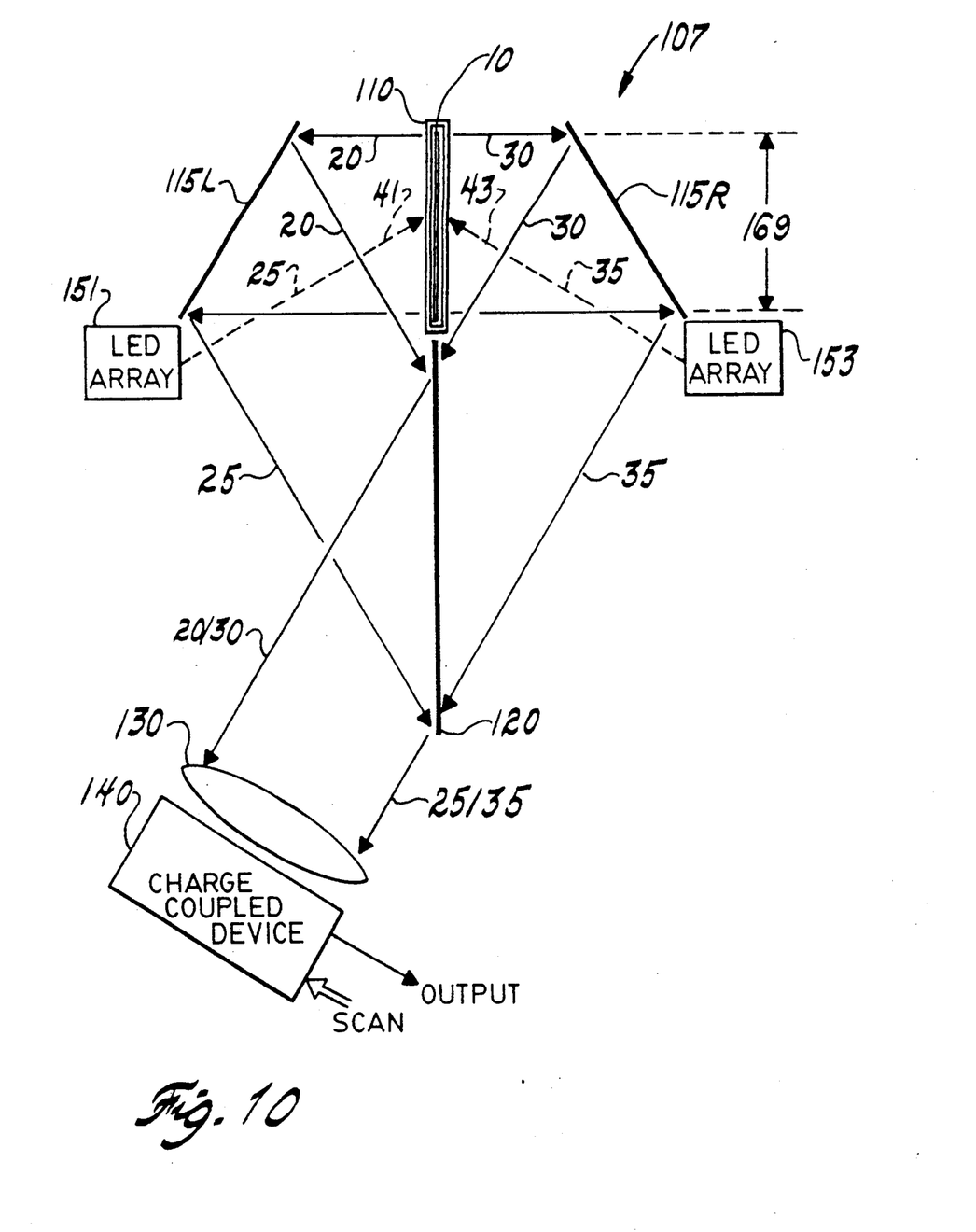
FIG. 10 is a schematic end view of a further alternative embodiment of this invention.
Figure 11:
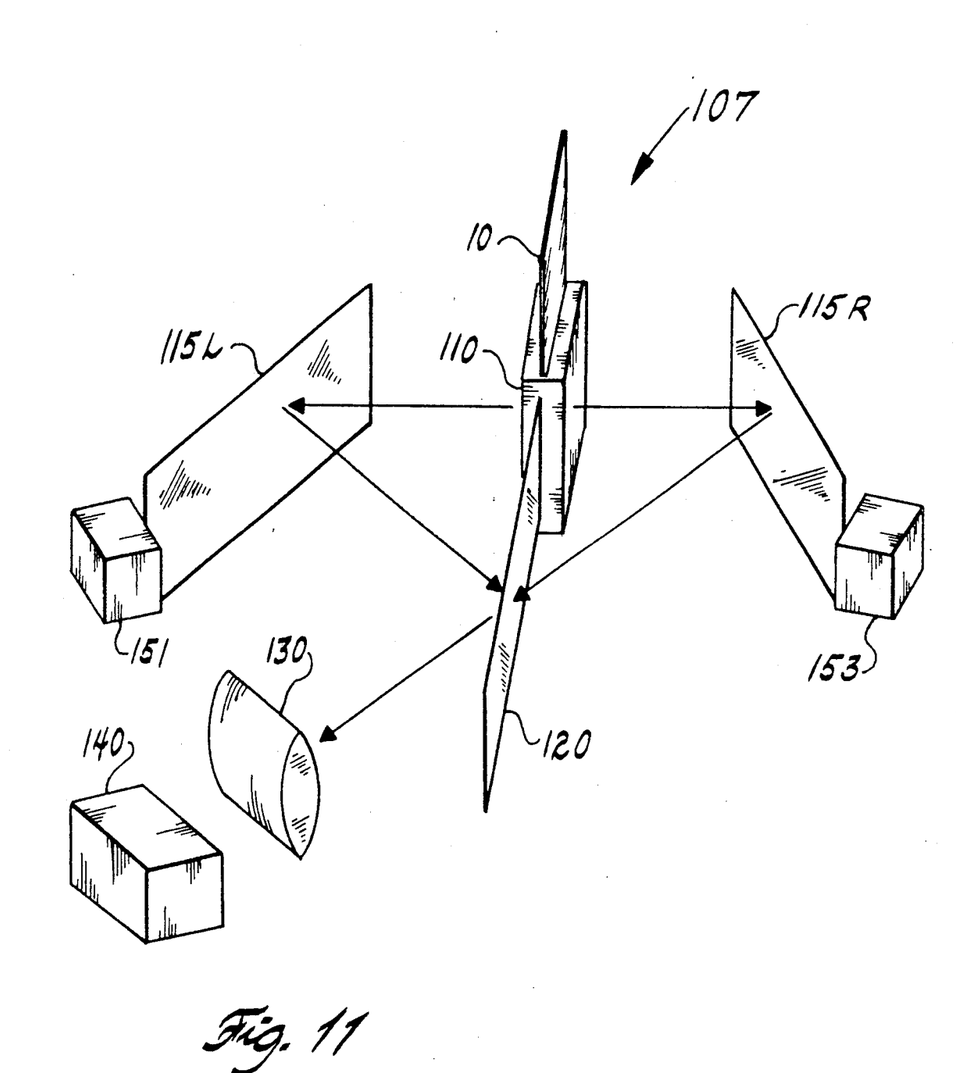
FIG. 11 is a perspective view of the embodiment of this invention illustrated in FIG. 10.

FIGS. 10 and 11 illustrate alternative views of barcode reading apparatus 107 in which card 10 is oriented in a direction a direction perpendicular to that previously described. As illustrated in FIG. 10, card 10 is inserted in a direction perpendicular to the plane of illustration. Card 10 is illuminated from via light emitting diode arrays 151 and 153. Reflector 115L is disposed to reflect light from the left side of card 10 to beam splitter 120, which is disposed in the plane of card 10. Similarly, reflector 115R reflects light from the right side of card 10 to the opposite face of beam splitter 120. These reflectors are disposed so that card 10 is viewed on the perpendicular. Two overlaid images are received by lens 130 and charge coupled device 140.

Barcode reading apparatus 107 illustrated in FIG. 10 appears similar to barcode reading apparatus 106 illustrated in FIG. 9. They are in fact quite different. Barcode reading apparatus 106 of FIG. 9 has beam splitter 120 disposed below the inserted card 10. Barcode reading apparatus 107 of FIG. 10 has beam splitter 120 disposed to one side of the inserted card 10. Note that bar height 165 illustrated in FIG. 9 is generally on the order of one half an inch. In contrast, barcode length 169 illustrated in FIG. 10 is on the order of 2 to 4 inches. This difference can be more readily appreciated by reference to the perspective view of FIG. 11. FIG. 11 clearly shows that beam splitter 120 as well as the combination of lens 130 and charge coupled device 140 are disposed beside car 10 and not below card 10. This construction is useful if some card handling is desired by allowing the card to continue through barcode reading apparatus 107. As seen in FIG. 11, the optics of barcode reading apparatus 107 are completely clear of the path of card 10 through the reader beyond the scanning region.

Because barcode reading apparatus 107 views card 10 along its length rather than along its height, the view of card 10 must be on the perpendicular. FIGS. 7 and 8 show that the depth of field 162 is about one eighth of an inch for a bar height 165 of about one half an inch. In contrast the barcode length 169 is on the order of three inches. The same deviation from perpendicular viewing would result in a much greater required depth of field in barcode reading apparatus 107 than that illustrated in FIGS. 7 and 8. It has been found that a barcode length 169 of three inches requires a beam splitter 120 of between 4 and one half and six inches. The total optical path length is this example would be about ten and one half inches. Commercially available subassemblies used to embody the combination of lens 130, charge coupled device 140 and the necessary associated processing and control electronics typically do not have this total optical path length. However, it would be easy to redesign such subassemblies to have this total optical path length.

One important class of uses of the barcode readers of this invention involves barcode imprinted employee badges. A barcode reader may be employed to take attendance by requiring the employee to present his or her employee badge to a barcode reader upon arrival at work and upon departure. Particular types of jobs may be tracked by requiring a reading of the employee badge when entering and leaving certain work areas. The employee badge can be used to control access to sensitive areas by requiring an employee badge with a particular barcode or class of barcodes for entry. The barcode readers of this invention will have a higher read rate than swipe type scanners. In addition, these barcode readers are insensitive to which side of the badge is inserted into the reader. These features are advantageous because they will make the system easier to use than heretofore possible and thus will speed acceptance of the system by employees.

A further use for such barcode readers is in event ticket taking. Barcode imprinted tickets permit greater security. For ticket taking applications, ticket holders would use barcode imprinted tickets to trigger automatic turnstiles, thereby reducing ticket-taking labor. A few manual ticket stations could be retained to deal with problems, handicapped persons, etc. The barcode readers of this invention are sufficiently easy to use and have a high enough read rate and security that it would be acceptable to first time users. In ticket applications, one could simultaneously automatically track attendance on an individual basis, by ticket type, etc. Use of consignment sale tickets could automatically be tracked for billing purposes. Abuses like passing back season passes to a second person could be detected and prevented by requiring a punch out before punching back in, or by barring a second entrance except at a manual entrance where ID is checked. General admission tickets could be tracked by number to prevent counterfeiting. Many current automatic ticketing systems use ticket printers that are already capable of printing barcode by sending them simple commands.

We claim:

1. A barcode reader for a planar card having a barcode imprinted on one side of one end thereof comprising:
 a guide slot for accommodating the end of the planar card having the barcode imprinted thereon;
 a source of illumination disposed to illuminate both sides of any planar card disposed in said guide slot;
 a light sensitive device including a plurality of light sensitive elements disposed in a line having a predetermined field of view;
 a beam splitter having first and second opposed faces disposed in a location within said field of view of said light sensitive device;
 a set of reflectors disposed for reflecting light from a first side of any planar card disposed in said guide slot to said first face of said beam splitter and for reflecting light from a second side of any planar card disposed in said guide slot to said second face of said beam splitter, whereby said light sensitive device receives an overlaid image of the first and second sides of any planar card disposed in said guide slot.

2. The barcode reader as claimed in claim 1, wherein: the side of the planar card opposite the barcode is imprinted in black, whereby said overlaid view of the first and second sides of any planar card disposed in said guide slot includes a pattern of light intensity corresponding to the barcode.

3. The barcode reader as claimed in claim 1, wherein:
 said light sensitive device is disposed opposite said first face of said beam splitter; and
 said source of illumination is disposed opposite said second face of said beam splitter for illuminating a first side of any planar card disposed in said guide slot via transmission through said beam splitter and reflection by a first subset of said set of reflectors and for illuminating a second side of any planar card disposed in said guide slot by refection by said beam splitter and reflection by a second subset of said set of reflectors.

4. The barcode reader as claimed in claim 3, wherein:
 said source of illumination includes a plurality of light emitting diodes disposed in a line parallel to said line of a plurality of light sensitive elements of said light sensitive device.

5. The barcode reader as claimed in claim 1, said source of illumination includes
 a first illumination source disposed to directly illuminate said first side of any planar card disposed in said guide slot, and
 a second illumination source disposed to directly illuminate said second side of any planar card disposed in said guide slot.

6. The barcode reader as claimed in claim 5, wherein:
 each of said first and second illumination sources includes a plurality of light emitting diodes disposed in a line parallel to said line of a plurality of light sensitive elements of said light sensitive device.

7. The barcode reader as claimed in claim 5, wherein:
 said first and second illumination sources are alternately activated by timing circuit means whereby said light sensitive device receives alternative images of said first and second sides of any planar card disposed in said guide slot.

8. The barcode reader as claimed in claim 7, wherein:
 said light sensitive device consists of a charge coupled device having a predetermined scan rate; and
 said first and second illumination sources are alternately activated in synchronism with said predetermined scan rate by said timing circuit means whereby alternate scans of said charge coupled device include images of said first and second sides of any planar card disposed in said guide slot, respectively.

9. The barcode reader as claimed in claim 7, wherein:
 said light sensitive device consists of a charge coupled device having a predetermined scan rate; and
 said first and second illumination sources are alternately activated in synchronism with said predetermined scan rate by said timing circuit means whereby said first illumination source is activated for a predetermined plurality of scans of said charge coupled device followed by activation of said second illumination source for said predetermined plurality of scans of said charge coupled device.

10. The barcode reader as claimed in claim 5, wherein:
 said first and second illumination sources have respective illumination intensities adjusted to provide the same intensity of respective images of the first and second sides of any planar card disposed in said guide slot.

11. The barcode reader as claimed in claim 1, wherein:
 said beam splitter consists of a half silvered mirror.

12. The barcode reader as claimed in claim 1, further comprising:
 an optical system for focusing light from said beam splitter to said light sensitive device.

13. The barcode reader as claimed in claim 12, wherein:
 the combination of said optical system and said light sensitive device have a limited depth of field; and
 said guide slot, said beam splitter and said set of reflectors are disposed so that the images of both sides of the barcode of any planar card disposed in said guide slot are within said limited depth of field.

14. The barcode reader as claimed in claim 1, wherein:
 said guide slot is constructed for permitting the planar card having the barcode imprinted thereon to pass through the barcode reader.

15. The barcode reader as claimed in claim 1, wherein:
said beam splitter is disposed below and on a first side of said guide slot at a first orientation;
said set of reflectors includes
  a first reflector disposed on a first side of said guide slot a said first orientation for reflecting light from said first side of said guide slot to said first face of said beam splitter,
  a second reflector disposed on a second side opposite to said first side of said guide slot at a second orientation opposite to said first orientation for reflecting light from said second side of guide slot; and
  a third reflector disposed on said second side of said guide slot at first orientation for reflecting light from said second reflector to said second face of said beam splitter.

16. The barcode reader as claimed in claim 15, wherein:
said first, second and third reflectors each include a first surface mirror.

17. The barcode reader as claimed in claim 15, wherein:
said first and second reflectors each consist of a right angle prism having first sides parallel to the plane of any planar card disposed in said guide slot, second sides disposed at right angles to said first sides and third sides disposed at an angle to reflect light from respective sides of any planar card; and
said third reflector consists of a right angle prism having a first side parallel to the plane of any planar card disposed in said guide slot, a second side disposed parallel to said second side of said second reflector and a third side disposed at an angle to reflect light from said second reflector to said second face of said beam splitter.

18. The barcode reader as claimed in claim 17, wherein:
said first, second and third reflectors further include a mirrored coating on said third sides for reflecting light.

19. The barcode reader as claimed in claim 1, wherein:
said beam splitter is disposed within the plane of any planar card disposed in said guide slot and below said guide slot; and
said set of reflectors includes
  a first reflector disposed on a first side of said guide slot at first orientation for reflecting light from said first side of said guide slot to said first face of said beam splitter, and
  a second reflector disposed on a second side opposite to said first side of said guide slot at a second orientation opposite to said first reflector for reflecting light from said second side of guide slot to said second face of said beam splitter.

20. The barcode reader as claimed in claim 19, wherein:
said first and second reflectors are each disposed at respective orientation whereby said overlaid image of each of the first and second sides of any planar card disposed in said guide slot is via the perpendicular to the planar card.

21. The barcode reader as claimed in claim 1, wherein:
said beam splitter is disposed within the plane of any planar card disposed in said guide slot and beside said guide slot; and
said set of reflectors includes
  a first reflector disposed on a first side of said guide slot at first orientation for reflecting light from said first side of said guide slot to said first face of said beam splitter, whereby said image of the first side of any planar card disposed in said guide slot is via the perpendicular to the planar card, and
  a second reflector disposed on a second side opposite to said first side of said guide slot at a second orientation opposite to said first reflector for reflecting light from said second side of guide slot to said second face of said beam splitter, whereby said image of the second side of any planar card disposed in said guide slot is via the perpendicular to the planar card.

* * * * *